United States Patent
Li (10) Patent No.: US 10,496,167 B2
(45) Date of Patent: Dec. 3, 2019

(54) OPERATION METHOD AND APPARATUS FOR VIRTUAL REALITY DEVICE AND VIRTUAL REALITY DEVICE

(71) Applicant: Baidu Online Network Technology (Beijing) Co., Ltd., Beijing (CN)

(72) Inventor: Feng Li, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 113 days.

(21) Appl. No.: 15/617,392

(22) Filed: Jun. 8, 2017

(65) Prior Publication Data

US 2018/0173307 A1 Jun. 21, 2018

(30) Foreign Application Priority Data

Dec. 20, 2016 (CN) .......................... 2016 1 1185873

(51) Int. Cl.
   *G09G 1/00* (2006.01)
   *G06F 3/01* (2006.01)
(52) U.S. Cl.
   CPC .................................... *G06F 3/015* (2013.01)
(58) Field of Classification Search
   CPC ......... G06F 3/01; G06F 3/0484; G06T 19/20; G09G 5/003; G09G 5/377
   See application file for complete search history.

(56) References Cited

U.S. PATENT DOCUMENTS

2016/0178904 A1* 6/2016 Deleeuw .............. H04N 13/398
                                                                345/8
2016/0228771 A1* 8/2016 Watson ................... G06F 3/013

FOREIGN PATENT DOCUMENTS

JP         2012-109708 A      6/2012

\* cited by examiner

*Primary Examiner* — Michael A Faragalla
(74) *Attorney, Agent, or Firm* — Nixon Peabody LLP (57) ABSTRACT

An operation method and an apparatus for a virtual reality device and a virtual reality device. A special implementation of the method comprises: collecting at least one virtual scene characteristic parameter associated with a fidelity of a virtual scene presented by a virtual reality device; determining a fidelity reduction factor of the virtual scene based on the at least one virtual scene characteristic parameter; executing a fidelity reducing operation for the virtual scene when the fidelity reduction factor reaches a predetermined threshold value. The implementation implements a self-adaptive reduction of the virtual scene to prevent that the virtual scene with the excessive fidelity has a negative impact on a user's physical and mental health.

19 Claims, 4 Drawing Sheets

OPERATION METHOD AND APPARATUS
FOR VIRTUAL REALITY DEVICE AND
VIRTUAL REALITY DEVICE

CROSS-REFERENCE TO RELATED
APPLICATION

This application claims the priority of Chinese Patent Application No. 201611185873.X, entitled "Operation Method and Apparatus for Virtual Reality Device and Virtual Reality Device," filed on Dec. 20, 2016, the content of which is incorporated herein by reference in its entirety.

TECHNICAL FIELD

The present application relates to the field of computer technology, and particularly to the field of virtual reality technology, and more particularly to an operation method and apparatus for a virtual reality device and a virtual reality device.

BACKGROUND

Virtual reality is a three-dimensional virtual world produced by using computer simulations, providing a user with visual, auditory, tactile and other sensory simulations, so that the user feels as if he were in a real world and can timely and freely observe the objects within the three-dimensional space. This technology integrates the latest development of computer graphics, computer simulation, artificial intelligence, sensing, display and network parallel processing technology, and is a high-tech simulation system generated assisted by computer technology.

However, the user experience of the current virtual reality technology is not perfect. An excessive realistic experience provided by an immersive experience and a three-dimensional high-definition image etc. may sometimes cause negative effects such as dizziness, vomiting, visual damage and mental and emotional damages to the user, and may even bring more serious harm to vulnerable users such as very young, old people, women and users with potentially relevant diseases.

SUMMARY

An objective of the present application is to provide an improved operation method an operation method and an apparatus for a virtual reality device and a virtual reality device, so as to solve the technical problems mentioned in the Background section.

In a first aspect, the present application provides an operation method for a virtual reality device. The method comprises: collecting at least one virtual scene characteristic parameter associated with a fidelity of a virtual scene presented by a virtual reality device; determining a fidelity reduction factor of the virtual scene based on the at least one virtual scene characteristic parameter; executing a fidelity reducing operation for the virtual scene when the fidelity reduction factor reaches a predetermined threshold value.

In some embodiments, the above method also comprises: collecting at least one physiological characteristic parameter of a user of the virtual reality device.

In some embodiments, the determining a fidelity reduction factor of the virtual scene based on the at least one virtual scene characteristic parameter comprises: determining a fidelity reduction factor of the virtual scene based on the at least one virtual scene characteristic parameter and the collected at least one physiological characteristic parameter.

In some embodiments, the determining a fidelity reduction factor of the virtual scene based on the at least one virtual scene characteristic parameter comprises: determining a fidelity coefficient of each virtual scene characteristic for every virtual scene characteristic based on the collected characteristic parameter and the preset fidelity threshold value; determining a fidelity reduction factor of the virtual scene based on the determined fidelity coefficient of each virtual scene characteristic and a corresponding weighted value.

In some embodiments, the determining a fidelity reduction factor of the virtual scene based on the at least one virtual scene characteristic parameter and the collected at least one physiological characteristic parameter comprises: determining a fidelity coefficient of each virtual scene characteristic for every virtual scene characteristic based on the collected characteristic parameter and the preset fidelity threshold value; determining a fidelity reduction factor of the virtual scene based on the determined fidelity coefficient for each virtual scene characteristic, at least one physiological characteristic parameter and a corresponding weighted value.

In some embodiments, the weighted value of the at least one physiological characteristic parameter is preset based on a health parameter of the user.

In some embodiments, the weighted value of each virtual scene characteristic is preset based on the virtual scene characteristic.

In some embodiments, the executing the fidelity reducing operation for the virtual scene when the fidelity reduction factor reaches the predetermined threshold value comprises: determining the reduction coefficient for each virtual scene characteristic based on the determined fidelity reduction factor; executing the fidelity reducing operation for each virtual scene characteristic based on the determined reduction coefficient for each virtual scene characteristic.

In some embodiments, the determining the reduction coefficient for each virtual scene characteristic based on the determined fidelity reduction factor comprises: determining the reduction coefficient for each virtual scene characteristic based on the determined fidelity reduction factor and the fidelity coefficient of each virtual scene characteristic.

In some embodiments, the executing the fidelity reducing operation for each virtual scene characteristic based on the determined reduction coefficient for each virtual scene characteristic comprises: choosing and executing at least one fidelity reducing operation from a set of fidelity reducing operations based on the reduction coefficient for each virtual scene characteristic and a reduction rate of every fidelity reducing operation relative to each virtual scene characteristic, wherein the reduction rate of every fidelity reducing operation relative to each virtual scene characteristic is recorded in advance.

In some embodiments, the virtual scene characteristic comprises at least one of the following scene characteristics: a sound characteristic, an image characteristic and a movement characteristic.

In a second aspect, the present application provides an operation apparatus for a virtual reality device. The apparatus comprises: a scene characteristic collecting unit for collecting at least one virtual scene characteristic parameter associated with a fidelity of a virtual scene presented by a virtual reality device; a determining unit for determining a fidelity reduction factor of the virtual scene based on the at least one virtual scene characteristic parameter; a executing unit for executing a fidelity reducing operation for the virtual scene when the fidelity reduction factor reaches a predetermined threshold value.

In some embodiments, the apparatus further comprises: a collecting physiological characteristic unit for collecting at least one physiological characteristic parameter of a user of the virtual reality device.

In some embodiments, the determining unit is further configured to determine the fidelity reduction factor of the virtual scene based on the at least one virtual scene characteristic parameter and the collected at least one physiological characteristic parameter.

In some embodiments, the determining unit further is configured to: determine a fidelity coefficient of each virtual scene characteristic for every virtual scene characteristic based on the collected characteristic parameter and the preset fidelity threshold value; determine the fidelity reduction factor of the virtual scene based on the determined fidelity coefficient of each virtual scene characteristic and a corresponding weighted value.

In some embodiments, the determining unit is further configured to: determine the fidelity coefficient of each virtual scene characteristic for every virtual scene characteristic based on the collected characteristic parameter and the preset fidelity threshold value; determine the fidelity reduction factor of the virtual scene based on the determined fidelity coefficient of each virtual scene characteristic, at least one physiological characteristic parameter and a corresponding weighted value.

In some embodiments, the weighted value of the at least one physiological characteristic parameter is preset based on a health parameter of the user.

In some embodiments, the weighted value of each virtual scene characteristic is preset based on the virtual scene characteristic.

In some embodiments, the executing unit comprises: a determining subunit for determining the reduction coefficient for each virtual scene characteristic based on the determined fidelity reduction factor; an executing subunit for executing the fidelity reducing operation for each virtual scene characteristic based on the determined reduction coefficient for each virtual scene characteristic.

In some embodiments, the determining subunit is further configured to: determine the reduction coefficient for each virtual scene characteristic based on the determined fidelity reduction factor and the fidelity coefficient of each virtual scene characteristic.

In some embodiments, the executing subunit is further configured to: choose and execute at least one fidelity reducing operation from a set of fidelity reducing operations based on the reduction coefficient for each virtual scene characteristic and a reduction rate of every fidelity reducing operation relative to each virtual scene characteristic, wherein the reduction rate of every fidelity reducing operation relative to each virtual scene characteristic is recorded in advance.

In a third aspect, the present application provides a virtual reality device. The virtual reality device comprises an operation apparatus for a virtual reality device of any one of the implementations in the second aspect.

The operation method and apparatus for a virtual reality device, and the virtual reality device provided by the present application may execute the fidelity reducing operation for the virtual scene in time to prevent that the excessive fidelity may have a negative impact on the user when the fidelity of the virtual scene presented by the virtual reality device is greater than the fidelity threshold value.

BRIEF DESCRIPTION OF THE DRAWINGS

Other features, objectives and advantages of the present application will become more apparent upon reading the detailed description to non-limiting embodiments with reference to the accompanying drawings.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that for the ease of description, only the parts related to the relevant disclosure are shown in the accompanying drawings.

It should also be noted that the embodiments in the present application and the characteristics in the embodiments may be combined with each other on a non-conflict basis. The present application will be described below in detail with reference to the accompanying drawings and in combination with the embodiments.

Figure 1:
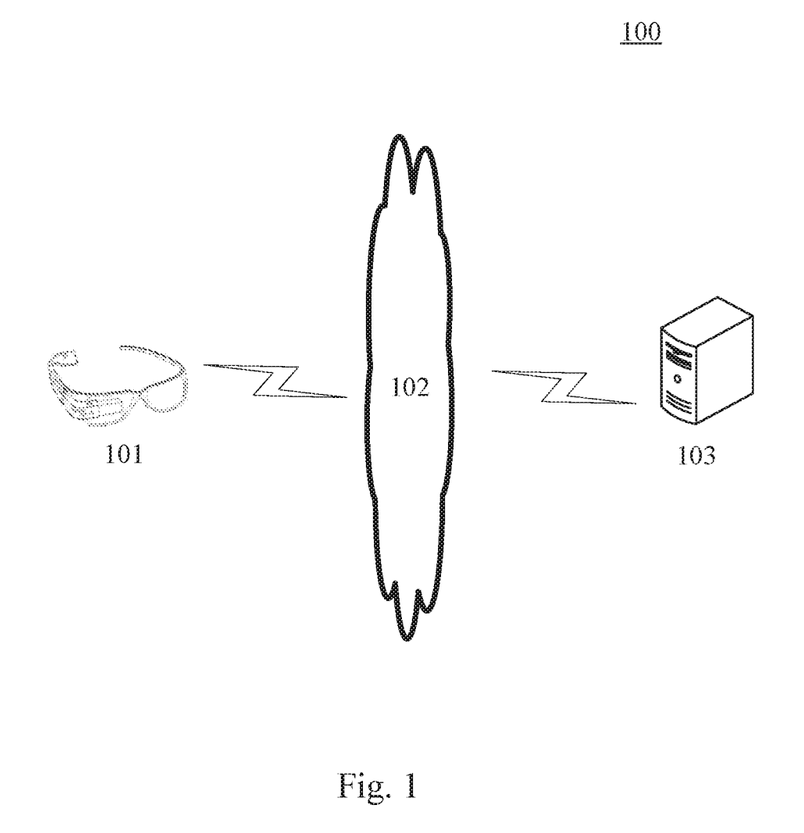
FIG. 1 is an architectural diagram of an exemplary system in which the present application may be implemented.

FIG. 1 shows an exemplary architecture of a system 100 which may be used by an operation method and apparatus for a virtual reality device based on the embodiments of the present application.

As shown in FIG. 1, a system architecture may include a virtual reality device 101, a network 102 and a server 103. The network 102 serves as a medium providing a communication link between the virtual reality device 101 and the server 103. The network 102 may include various types of connection such as a wire communication link, a wireless communication link or an optical fibre cable.

The user may use the virtual reality device 101 to interact with the server 103 through the network 102 in order to receive or transmit messages. Various client applications configured to present a virtual scene may be installed on the virtual reality device 101. The server 103 may be servers providing various services, for example a background server providing support for the virtual scene presented on the virtual reality device 101.

It should be noted that the operation method for the virtual reality device provided by the embodiments of the present application is generally performed by the virtual reality device 101. Some steps may also be performed by the server 103. Accordingly, the operation apparatus for the virtual reality device is generally installed on the virtual reality device 101, while some units may also be installed on the server 103.

It should be appreciated that the numbers of virtual reality devices, networks and servers in FIG. 1 are merely illustrative. Any number of virtual reality devices, networks and servers may be provided based on the actual requirements.

Figure 2:
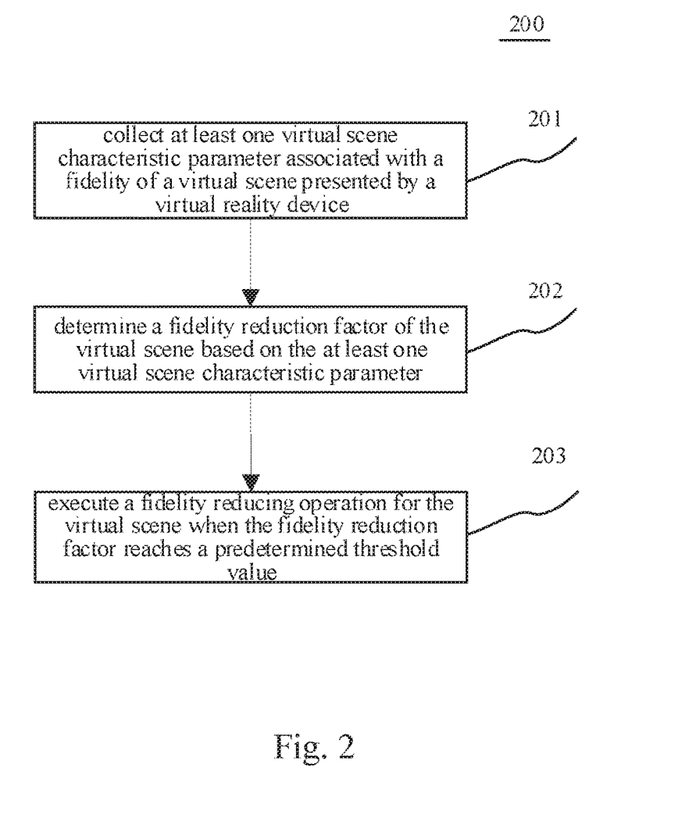
FIG. 2 is a flowchart of an embodiment of an operation method for a virtual reality device based on the present application.

Further referring to FIG. 2, a process 200 of one embodiment of an operation method for a virtual reality device based on the present application is shown. The operation method for the virtual reality device comprises the following:

Step 201, collect at least one virtual scene characteristic parameter associated with a fidelity of a virtual scene presented by a virtual reality device.

In the present embodiment, an electrical device (such as the virtual reality device shown in FIG. 1) on which an operation method for a virtual reality device executes, may collect at least one virtual scene characteristic parameter associated with the fidelity of the virtual scene presented by the virtual reality device. Here, the virtual scene characteristic may be various technical characteristics that can reflect the fidelity of the virtual scene. The virtual scene characteristic parameter is a characteristic value collected for the virtual scene characteristic. The magnitude of the characteristic value can directly reflect the fidelity of the virtual scene.

Optionally, the virtual scene characteristic may include one of a sound characteristic, an image characteristic and a movement characteristic. For example, the virtual scene is in a horror movie. The sound characteristic may be a characteristic of a sound effect mode, a frequency, a timbre threshold value etc. of a sound. The image characteristic may be a characteristic of brightness, resolution, color etc. of an image, the corresponding characteristic values may be a threshold value or a variable frequency value. The movement characteristic may be the movement which the current virtual scene requires the user to do, for example, the angle at which the user needs to rotate her body.

Step 202, determine a fidelity reduction factor of the virtual scene based on the at least one virtual scene characteristic parameter.

In the present embodiment, the electrical device may first set a mapping relationship between each virtual scene characteristic parameter and the fidelity reduction factor. Here, the fidelity reduction factor is configured to express an urgency to execute a fidelity reducing operation for the virtual scene. Generally, the greater the fidelity reduction factor is, the greater is the urgency to execute the fidelity reducing operation for the virtual scene. Therefore, after obtaining the at least one virtual scene characteristic parameter in step 201, the electrical device may calculate the fidelity reduction factor of the virtual scene based on the mapping relationship. The electrical device can calculate the fidelity reduction factor locally, or may utilize a remote server to calculate.

In some optional implementations of the present embodiment, step 202 may specifically comprise the following:

First, for every virtual scene characteristic, the electrical device may analyze based on the collected characteristic parameter and the preset fidelity threshold value to determine a fidelity coefficient of each virtual scene characteristic. Here, the fidelity coefficient evaluates the fidelity of single virtual scene characteristic, which is usually associated with a difference between the characteristic parameter and the fidelity threshold value. Optionally, the fidelity coefficient is determined as a value when the characteristic parameter is greater than the fidelity threshold value. However, the fidelity coefficient is determined as another value when the characteristic parameter is greater than the fidelity threshold value. For example, in relation to switching speeds for brightness or color, the corresponding fidelity coefficient is set to 1 when the switching speed is greater than the speed threshold value, otherwise it is set to 0. In relation to holding time of a dark image, the corresponding fidelity coefficient is set to 1 when the holding time is greater than the time threshold value, otherwise it is set to 0. In relation to the angle of the user's rotation, the corresponding fidelity coefficient is set to 1 when the angle of the user's rotation is greater than the angle threshold value, otherwise it is set to 0. In addition, the fidelity coefficients and the above differences may also be other types of associating relationship. For example, the fidelity coefficient may be monotonically increasing or monotonically decreasing relative to the difference. The step may also include normalization of the calculated fidelity coefficients to ensure that resulting fidelity coefficients have a value between 0 and 1 for subsequent processing.

Next, the electrical device may determine the fidelity reduction factor of the virtual scene based on the determined the fidelity coefficient of each virtual scene characteristic and a corresponding weighted value. Here, the weighted value of the fidelity coefficient for the virtual scene characteristic may represent a contribution of the virtual scene characteristic to the overall fidelity of the virtual scene. Optionally, the weighted value of each virtual scene characteristic may be preset based on the virtual scene characteristic. Generally, the greater the impact of the virtual scene characteristic on the fidelity is, the greater the set weighted value is. For example, assuming a total of m virtual scene characteristics, a calculation formula of a fidelity reduction factor F may be $F=k_1 \times c_1 + k_2 \times c_2 + k_3 \times c_3 + \ldots + k_i \times c_i + \ldots + k_m \times c_m$, where the $k_i$ is the weight corresponding to the i-th virtual scene characteristic, and the $c_i$ is the fidelity coefficient calculated for the i-th virtual scene characteristic. Here, the weight corresponding to each virtual scene characteristic may be set in advance and can also be updated continuously by statistical studies.

0001Step 203, execute a fidelity reducing operation for the virtual scene when the fidelity reduction factor reaches a predetermined threshold value.

In the present embodiment, based on the fidelity reduction factor obtained in step 202, the electrical device may continuously detect whether the fidelity reduction factor has reached a predetermined threshold value, and the fidelity reducing operation for the virtual scene is executed when detecting that the fidelity reduction factor has reached the predetermined threshold value. Here, the fidelity threshold value can be entirely set to a specific value by the user, or multiple options can be provided for the user to choose from. The fidelity reducing operation may be various operations configured to decrease the fidelity of the virtual scene. These operations include, but are not limited to, an operation of adjusting the characteristic value of the virtual scene characteristic in the direction of decreasing the fidelity coefficient. For example, in terms of sounds, the reducing operation may be reducing the change of the frequency of sound by reducing or eliminating the high frequency sound and the low frequency sound, changing the sound, eliminating the sound, playing the music which the user is familiar with or playing a soothing music etc. In terms of videos or pictures, the fidelity may be decreased by a dedicated video algorithm such as enhancing the brightness for dark scenes, executing interpolating smooth process when switching the scene, executing the fuzzy process for the image etc., decreasing or increasing the distance between the image display position and the user, or skipping the image, etc. The fidelity reducing operation may also comprise an operation of giving the user more feedbacks from the real world through the fan of the device, the processor of the device or the associated smart home, which can distract the user's attention so as to contribute to the reduction of the fidelity. These operations include, but not limited to, using the fan to decrease the temperature, using the processor to intensively calculate to increase the temperature, playing the additional voice prompts and other operations so as to decrease the fidelity of the virtual scene perceived by the user. In addition, the fidelity reducing operation may also be an operation of turning off the virtual reality device such as the power off operation.

It should be noted that when executing the fidelity reducing operation, the corresponding fidelity reduction factor can be calculated by continuously calculating the characteristic parameter to detect the decrease of the fidelity reduction factor caused by executing the fidelity reducing operation. If the fidelity reduction factor does not decrease to a value less than the predetermined threshold value, the fidelity reducing operation needs to be continued. If executing the fidelity reducing operation a number of times does not cause the fidelity reduction factor to decrease significantly, the virtual reality device may be directly turned off.

In some optional implementations of the present embodiment, step 203 may be executed as follows:

First, a reduction coefficient for each virtual scene characteristic is determined based on the determined fidelity reduction factor. The reduction coefficient is configured to express the degree of decreasing the fidelity coefficient for the virtual scene characteristic when executing reducing the fidelity for each virtual scene characteristic. The higher the fidelity reduction coefficient is, the higher the reduction degree is. Generally, when the reduction coefficient for each virtual scene characteristic is determined based on the fidelity reduction factor, the reduction coefficient for each virtual scene characteristic and the fidelity reduction factor is a positive correlation. The reduction coefficient for each virtual scene characteristic is determined through the fidelity reduction factor, thereby avoiding insufficient reduction as well as excessive reduction which may affect the expression effect of the virtual scene. Optionally, the determining the reduction coefficient for each virtual scene characteristic based on the determined fidelity reduction factor may further comprise: determining the reduction coefficient for each virtual scene characteristic based on the determined fidelity reduction factor and the fidelity coefficient of each virtual scene characteristic. In the embodiment, when the reduction coefficient for each virtual scene characteristic is determined, in addition to considering the fidelity reduction factor, it also considers the fidelity coefficient of each virtual scene characteristic. Generally, the higher the fidelity coefficient is, the higher is the reduction coefficient assigned by the corresponding virtual scene characteristic. The higher the fidelity coefficient is, the lower the reduction coefficient assigned by the corresponding virtual scene characteristic is. By this method, it can be ensured that the virtual scene characteristic corresponding to the high fidelity coefficient is first reduced, and the reduction is more targeted.

Next, the fidelity reducing operation is executed on each virtual scene characteristic based on the determined reduction coefficient for each virtual scene characteristic. Optionally, at least one fidelity reducing operation, and the reduction rate of every fidelity reducing operation relative to every virtual scene characteristic may be recorded in advance. When the fidelity reducing operation is executed on each virtual scene characteristic based on the determined reduction coefficient for each virtual scene characteristic, at least one fidelity reducing operation may be chosen from a set of fidelity reducing operations and executed based on the reduction coefficient for each virtual scene characteristic and the reduction rate of every fidelity reducing operation relative to each virtual scene characteristic, wherein the reduction rate of every fidelity reducing operation relative to each virtual scene characteristic is recorded in advance. Generally, the reduction rate may express the reduction degree of the virtual scene characteristic whenever the fidelity reducing operation is executed once, or executed in a unit range. The chosen fidelity reducing operation to be executed may be a single fidelity reducing operation or an operation combination of single fidelity reducing operations. The reduction efficiency of each fidelity reducing operation in the operation combination can be superimposed. Generally, when the fidelity reducing operation to be executed is chosen, the fidelity reducing operation corresponding to a high reduction rate may be preferentially chosen, reaching the established goal of reducing the fidelity through minimal numbers, or minimal range of the fidelity reducing operations. It should be noted that when the fidelity reducing operation is chosen based on the reduction efficiency, the reduction efficiency may be combined with other factors to choose the fidelity reducing operation or the combination of the fidelity reducing operations with the best combined effect.

The method provided by the above embodiment of the present application may execute the fidelity reducing operation for the virtual scene in time to prevent that the excessive fidelity may have a negative impact on the user when the fidelity of the virtual scene presented by the virtual reality device is greater than the fidelity threshold value.

Figure 3:
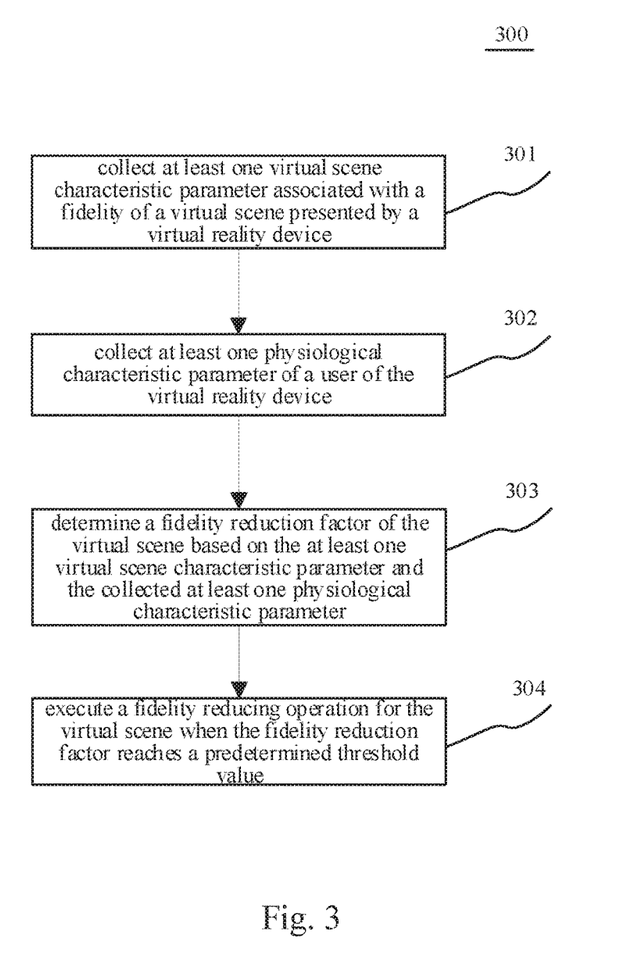
FIG. 3 is a flowchart of another embodiment of an operation method for a virtual reality device based on the present application.

Referring further to FIG. 3, it shows a process 300 of another embodiment of an operation method for a virtual reality device. The process 300 of an operation method for a virtual reality device comprises the following.

Step 301, collect at least one virtual scene characteristic parameter associated with a fidelity of a virtual scene presented by a virtual reality device.

In the present embodiment, the specific process of step 301 may be referred to step 201 of the embodiment corresponding to FIG. 2, and will not be repeated here.

Step 302, collect at least one physiological characteristic parameter of a user of the virtual reality device.

In the present embodiment, an electrical device may use a sensor to collect at least one physiological characteristic parameter of the user of the virtual reality device. Optionally, the physiological characteristics may include, but is not limited to, a heart rate and its change, a body temperature and its change, a sound, a breathing frequency and its change, an expression and its change, and a user position and its change. The physiological characteristic parameters may reflect a user's tolerance degree to the fidelity of the virtual scene.

In the present embodiment, the specific process of step 302 may be referred to step 202 of the embodiment corresponding to FIG. 2, and will not be repeated here.

Step 303, determine a fidelity reduction factor of the virtual scene based on the at least one virtual scene characteristic parameter and the collected at least one physiological characteristic parameter.

In the present embodiment, the electrical device may preset a mapping relationship between the fidelity reduction factor and each virtual scene characteristic parameter as well as at least one physiological characteristic parameter. Therefore, after collecting the at least one virtual scene characteristic parameter in step 301 and collecting at least one physiological characteristic parameter in step 302, the electrical device may determine the fidelity reduction factor of the virtual scene based on the mapping relationship.

In some optional implementations of the present embodiment, step 303 may be executed as follows.

First, the fidelity coefficient of every virtual scene characteristic is determined for each virtual scene characteristic based on the collected characteristic parameter and the preset fidelity threshold value. This process may be referred to the corresponding implementation in the embodiment corresponding to FIG. 2, and will not be repeated here.

Next, the fidelity reduction factor of the virtual scene is determined based on the determined fidelity coefficient of each virtual scene characteristic, the at least one physiological characteristic parameter and the corresponding weighted value. Here, the weighted value corresponding to the physiological characteristic may evaluate a contribution of the physiological characteristic relative to an urgency of reducing the fidelity. Generally, the greater the impact of the physiological characteristic on the urgency of reducing the fidelity is, the greater the set weighted value is. For example, assuming a total of m virtual scene characteristics and n physiological characteristic parameters, a calculation formula of a fidelity reduction factor F may be $F=k1 \times c1+k2 \times c2+k3 \times c3+ \ldots +ki \times ci+ \ldots +km \times cm+l1 \times c1+l2 \times c2+l3 \times c3+ \ldots +lj \times cj+ \ldots +ln \times cn$. Here, the meaning of the ki and the ci may be referred to the above description, and will not be repeated here. The li is the weight corresponding to the j-th physiological characteristic parameter, and the cj is the j-th physiological characteristic parameter or the coefficient calculated for the j-th physiological characteristic parameter based on an algorithm. The algorithm may be referred to the method of calculating the fidelity coefficient for the virtual scene characteristic based on the virtual scene characteristic parameter in the above description. For example, when the j-th physiological characteristic parameter is a variable value of a pupil size, if the variable value is greater than the corresponding threshold value, the cj may be set to 1. If not, the cj may be set to 0. Here, the weight corresponding to each physiological characteristic parameter can be set in advance and can also be updated continuously by statistical studies. Optionally, the weighted value of the at least one physiological characteristic parameter is preset based on a health parameter of the user. Generally, the physiological characteristic parameter with a great impact on the health parameter of the user may be set to a great weight, and thus the fidelity reducing operation is quickly triggered when the physiological characteristic parameter with a great impact on the health of the user is abnormal.

Step 304, execute a fidelity reducing operation for the virtual scene when the fidelity reduction factor reaches a predetermined threshold value.

In the present embodiment, the specific process of step 304 may be referred to step 203 of the embodiment corresponding to FIG. 2, and will not be repeated here As can be seen from FIG. 3, compared to the embodiment corresponding to FIG. 2, the process 300 of an operation method for a virtual reality device in the present embodiment also consider the physiological characteristic parameter of the user when determining the fidelity reduction factor. Therefore, the timing of executing the fidelity reducing operation also associates with the current physiological condition of the user so that executing the fidelity reducing operation is more targeted to protect the user's physical and mental health.

Figure 4:
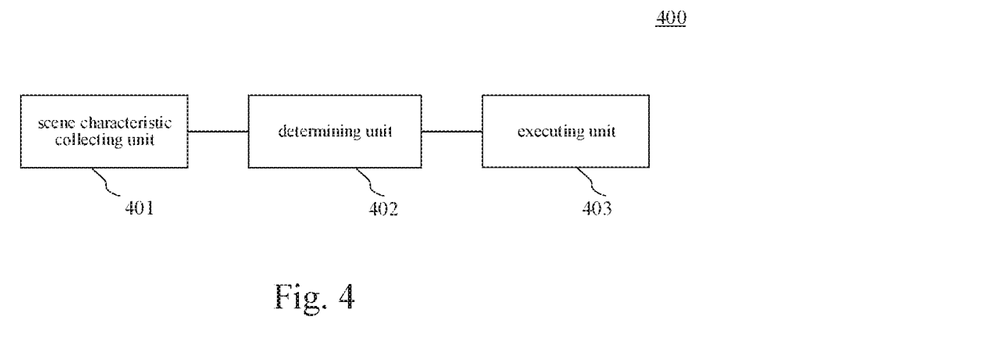
FIG. 4 is a structural diagram of an embodiment of an operation apparatus for a virtual reality device based on the present application.

Further referring to FIG. 4, as an implementation for the method shown in each of the above figures, the present application provides an embodiment of an operation apparatus for a virtual reality device. the embodiment of the apparatus corresponds to the embodiment of the method shown in FIG. 2. The apparatus may specifically apply to various electrical devices.

As shown in FIG. 4, an operation apparatus 400 for a virtual reality device described in the present embodiment comprises a scene characteristic collecting unit 401, a determining unit 402 and a executing unit 403. Here, the scene characteristic collecting unit 401 is configured to collect at least one virtual scene characteristic parameter associated with a fidelity of a virtual scene presented by a virtual reality device. The determining unit 402 is configured to determine a fidelity reduction factor of the virtual scene based on the at least one virtual scene characteristic parameter. The executing unit 403 is configured to execute a fidelity reducing operation for the virtual scene when the fidelity reduction factor reaches a predetermined threshold value.

In the present embodiment, the specific processes of the scene characteristic collecting unit 401, the determining unit 402 and the executing unit 403 may be referred to step 201, step 202 and step 203 of the embodiment corresponding to FIG. 2, and will not be repeated here.

In some optional implementations of the present embodiment, the apparatus 400 also comprises a physiological characteristic collecting unit (not shown). The physiological characteristic collecting unit is configured to collect at least one physiological characteristic parameter of a user of the virtual reality device. The specific process of the implementation may be referred to the corresponding step in the embodiment corresponding to FIG. 3, and will not be repeated here.

In some optional implementations of the present embodiment, the determining unit 402 is further configured to determine the fidelity reduction factor of the virtual scene based on the at least one virtual scene characteristic parameter and the collected at least one physiological characteristic parameter. The specific process of the implementation may be referred to the corresponding implementation in the embodiment corresponding to FIG. 2, and will not be repeated here.

In some optional implementations of the present embodiment, the determining unit 402 is further configured to: determine a fidelity coefficient of each virtual scene characteristic for every virtual scene characteristic based on the collected characteristic parameter and the preset fidelity threshold value; determine the fidelity reduction factor of the virtual scene based on the determined fidelity coefficient of each virtual scene characteristic and the corresponding weighted value. The specific process of the implementation may be referred to the corresponding implementation in the embodiment corresponding to FIG. 2, and will not be repeated here.

In some optional implementations of the present embodiment, the determining unit 402 is further configured to: determine a fidelity coefficient of each virtual scene characteristic for every virtual scene characteristic based on the collected characteristic parameter and the preset fidelity threshold value; determine the fidelity reduction factor of the virtual scene based on the determined fidelity coefficient of each virtual scene characteristic, the at least one physiological characteristic parameter and the corresponding weighted value. The specific process of the implementation may be referred to the corresponding implementation in the embodiment corresponding to FIG. 3, and will not be repeated here.

In some optional implementations of the present embodiment, the above weighted value of the at least one physiological characteristic parameter is preset based on a health parameter of the user.

In some optional implementations of the present embodiment, the above weighted value of each virtual scene characteristic is preset based on virtual scene characteristic.

In some optional implementations of the present embodiment, the executing unit comprises: a determining subunit (not shown) for determining a reduction coefficient for each virtual scene characteristic based on the determined fidelity reduction factor; a executing subunit (not shown) for executing the fidelity reducing operation for each virtual scene characteristic based on the determined reduction coefficient for each virtual scene characteristic. The specific process of the implementation may be referred to the corresponding implementation in the embodiment corresponding to FIG. 2, and will not be repeated here.

In some optional implementations of the present embodiment, the above determining subunit is further configured to determine the reduction coefficient for each virtual scene characteristic based on the determined fidelity reduction factor and fidelity coefficient of each virtual scene characteristic.

In some optional implementations of the present embodiment, the executing subunit is further configured to choose and execute at least one fidelity reducing operation from a set of fidelity reducing operations based on the reduction coefficient for each virtual scene characteristic and the reduction rate of every fidelity reducing operation relative to each virtual scene characteristic, wherein the reduction rate of every fidelity reducing operation relative to each virtual scene characteristic is recorded in advance.

The present application also provides an embodiment of the virtual reality device. The embodiment may include the operation apparatus for the virtual reality device described in the embodiment corresponding to FIG. 4.

Figure 5:
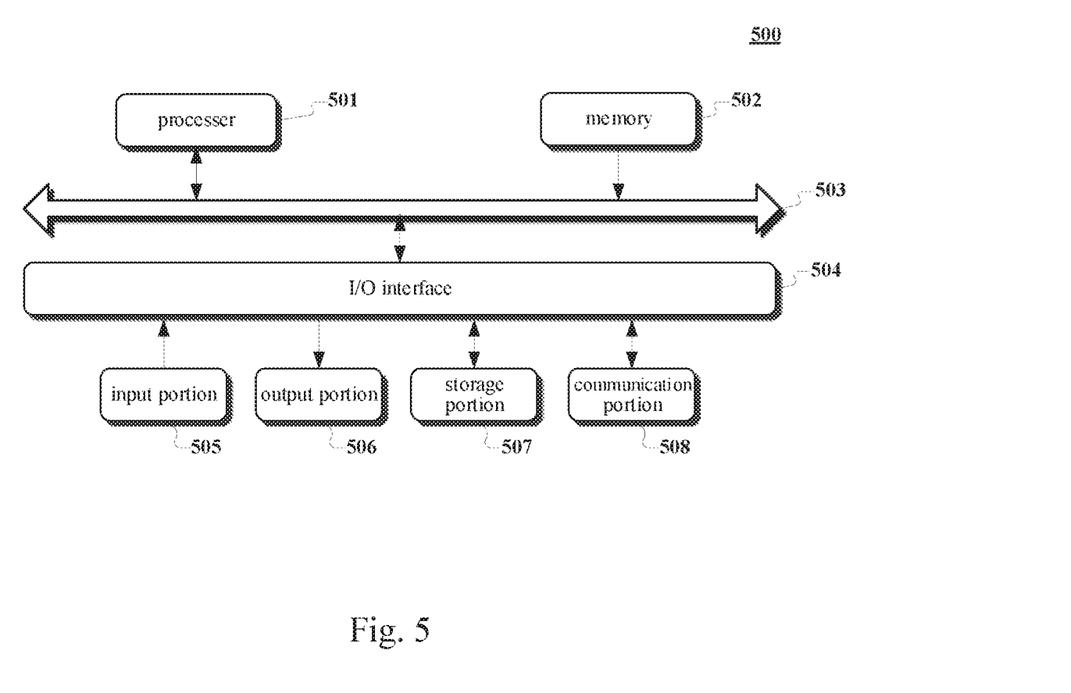
FIG. 5 illustrates a structural schematic diagram of a computer system adapted to implement a virtual reality device of the embodiments of the present application.

Referring to FIG. 5, a schematic structural diagram of a system 500 adapted to implement a virtual reality device of the embodiments of the present application is shown.

As shown in FIG. 5, a system structure 500 comprises a processor 501, which may execute various appropriate actions and processes in accordance with a program and data loaded into a memory 502 from a storage portion 507. The processor 501 and the memory 502 are connected to each other through a bus 503. An input/output (I/O) interface 504 is also connected to the bus 503.

The following components are connected to the I/O interface 504: an input portion 505 comprising a sensor etc.; an output portion 506 comprising a virtual reality display and a speaker etc.; a storage portion 507 comprising a hard disk etc.; and a communication portion 508 comprising a network interface card, such as a network card of the Wireless Fidelity etc. The communication portion 508 executes communication processes via a network, such as the Internet.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 508, and/or may be installed from the storage portion 507.

The flowcharts and block diagrams in the figures illustrate architectures, functions and operations that may be implemented according to the system, the method and the computer program product of the various embodiments of the present application. In this regard, each block in the flow charts and block diagrams may represent a module, a program segment, or a part of a code portion. The module, the program segment, or the part of the code portion comprises one or more executable instructions for implementing the specified logical function. It should also be noted that in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that each block in the block diagrams and/or the flowcharts and a combination of the blocks in the block diagrams and/or the flow charts may be implemented by a dedicated hardware-based system executing specific functions or operations, or by a combination of a dedicated hardware and computer instructions.

The units involved in the embodiments of the present application may be implemented by way of software or hardware. The described units may also be provided in a processor, for example, described as: a processor, comprising a scene characteristic collecting unit, a determining unit and a executing unit, where the names of these units are not considered as a limitation to the units in some cases. For example, the scene characteristic collecting unit may also be described as "a unit for collecting at least one virtual scene characteristic parameter associated with a fidelity of a virtual scene presented by a virtual reality device."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: collect at least one virtual scene characteristic parameter associated with a fidelity of a virtual scene presented by a virtual reality device; determine a fidelity reduction factor of the virtual scene based on the at least one virtual scene characteristic parameter; execute a fidelity reducing operation for the virtual scene when the fidelity reduction factor reaches a predetermined threshold value.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the disclosure, such as, technical solutions formed by replacing the features as disclosed in the present application with (but not limited to), technical features with similar functions.

What is claimed:

1. An operation method for a virtual reality device, the method comprising:

collecting at least one virtual scene characteristic parameter associated with a fidelity of a virtual scene presented by a virtual reality device;

determining a fidelity reduction factor of the virtual scene based on the at least one virtual scene characteristic parameter; and executing a fidelity reducing operation for the virtual scene in response to the fidelity reduction factor reaching a predetermined threshold value;

wherein the determining the fidelity reduction factor of the virtual scene based on the at least one virtual scene characteristic parameter comprises:

for each virtual scene characteristic corresponding to each of the at least one virtual scene characteristic parameter, determining a fidelity coefficient of the each virtual scene characteristic based on the collected at least one characteristic parameter and a preset fidelity threshold value, the fidelity coefficient evaluating fidelity of single virtual scene characteristic; and determining the fidelity reduction factor of the virtual scene based on the determined fidelity coefficient of the each virtual scene characteristic and a weighted value corresponding to the fidelity coefficient of the each virtual scene characteristic.

2. The method according to claim 1, the method further comprising: collecting at least one physiological characteristic parameter of a user of the virtual reality device.

3. The method according to claim 2, wherein the determining a fidelity reduction factor of the virtual scene based on the at least one virtual scene characteristic parameter comprises:

determining a fidelity reduction factor of the virtual scene based on the at least one virtual scene characteristic parameter and the collected at least one physiological characteristic parameter.

4. The method according to claim 3, wherein the determining a fidelity reduction factor of the virtual scene based on the at least one virtual scene characteristic parameter and the collected at least one physiological characteristic parameter comprises:

for the each virtual scene characteristic, determining a fidelity coefficient of the each virtual scene characteristic based on the collected at least one characteristic parameter and the preset fidelity threshold value; and determining a fidelity reduction factor of the virtual scene based on the determined fidelity coefficient of the each virtual scene characteristic, the at least one physiological characteristic parameter and a weighted value corresponding to the at least one physiological characteristic parameter.

5. The method according to claim 4, wherein the weighted value corresponding to the at least one physiological characteristic parameter is preset based on a health parameter of the user.

6. The method according to claim 1, wherein the weighted value corresponding to the fidelity coefficient of the each virtual scene characteristic is preset based on the each virtual scene characteristic.

7. The method according to claim 1, wherein the executing a fidelity reducing operation for the virtual scene when the fidelity reduction factor reaches a predetermined threshold value comprises:

determining a reduction coefficient for the each virtual scene characteristic based on the determined fidelity reduction factor; and executing a fidelity reducing operation for the each virtual scene characteristic based on the determined reduction coefficient for the each virtual scene characteristic.

8. The method according to claim 7, wherein the determining a reduction coefficient for the each virtual scene characteristic based on the determined fidelity reduction factor comprises: determining a reduction coefficient for the each virtual scene characteristic based on the determined fidelity reduction factor and the fidelity coefficient of the each virtual scene characteristic.

9. The method according to claim 7, wherein the executing a fidelity reducing operation for the each virtual scene characteristic based on the determined reduction coefficient for the each virtual scene characteristic comprises:

choosing and executing at least one fidelity reducing operation from a set of fidelity reducing operations based on the reduction coefficient for the each virtual scene characteristic and a reduction rate of every fidelity reducing operation relative to the each virtual scene characteristic, wherein the reduction rate of every fidelity reducing operation relative to the each virtual scene characteristic is recorded in advance.

10. The method according to claim 1, wherein the virtual scene characteristic comprises at least one of following scene characteristics: a sound characteristic, an image characteristic and a movement characteristic.

11. An operation apparatus for a virtual reality device, the apparatus comprising:

at least one processor; and a memory storing instructions, which when executed by the at least one processor, cause the at least one processor to perform operations, the operations comprising:

collecting at least one virtual scene characteristic parameter associated with a fidelity of a virtual scene presented by a virtual reality device;

determining a fidelity reduction factor of the virtual scene based on the at least one virtual scene characteristic parameter; and executing a fidelity reducing operation for the virtual scene when the fidelity reduction factor reaches a predetermined threshold value;

wherein the determining the fidelity reduction factor of the virtual scene based on the at least one virtual scene characteristic parameter comprises:

for each virtual scene characteristic corresponding to each of the at least one virtual scene characteristic parameter, determining a fidelity coefficient of the each virtual scene characteristic based on the collected at least one characteristic parameter and a preset fidelity threshold value, the fidelity coefficient evaluating fidelity of single virtual scene characteristic; and determining the fidelity reduction factor of the virtual scene based on the determined fidelity coefficient of the each virtual scene characteristic and a weighted value corresponding to the fidelity coefficient of the each virtual scene characteristic.

12. The apparatus according to claim 11, operations further comprising: collecting at least one physiological characteristic parameter of a user of the virtual reality device.

13. The apparatus according to claim 12, wherein the determining a fidelity reduction factor of the virtual scene based on the at least one virtual scene characteristic parameter comprises: determining a fidelity reduction factor of the virtual scene based on the at least one virtual scene characteristic parameter and the collected at least one physiological characteristic parameter.

14. The apparatus according to claim 13, wherein the determining a fidelity reduction factor of the virtual scene based on the at least one virtual scene characteristic parameter and the collected at least one physiological characteristic parameter comprises:
    for the each virtual scene characteristic, determining a fidelity coefficient of the each virtual scene characteristic based on the collected at least one characteristic parameter and the preset fidelity threshold value; and
    determining a fidelity reduction factor of the virtual scene based on the determined fidelity coefficient of the each virtual scene characteristic, the at least one physiological characteristic parameter and a weighted value corresponding to the at least one physiological characteristic parameter.

15. The apparatus according to claim 11, wherein the executing a fidelity reducing operation for the virtual scene when the fidelity reduction factor reaches a predetermined threshold value comprises:
    determining a reduction coefficient for the each virtual scene characteristic based on the determined fidelity reduction factor; and
    executing a fidelity reducing operation for the each virtual scene characteristic based on the determined reduction coefficient for the each virtual scene characteristic.

16. The apparatus according to claim 15, wherein the determining a reduction coefficient for the each virtual scene characteristic based on the determined fidelity reduction factor comprises: determining a reduction coefficient for the each virtual scene characteristic based on the determined fidelity reduction factor and the fidelity coefficient of the each virtual scene characteristic.

17. The apparatus according to claim 15, wherein the executing a fidelity reducing operation for the each virtual scene characteristic based on the determined reduction coefficient for the each virtual scene characteristic comprises: choosing and executing at least one fidelity reducing operation from a set of fidelity reducing operations based on the reduction coefficient for the each virtual scene characteristic and a reduction rate of every fidelity reducing operation relative to the each virtual scene characteristic, wherein the reduction rate of every fidelity reducing operation relative to the each virtual scene characteristic is recorded in advance.

18. A virtual reality device comprising the apparatus according to claim 11.

19. A non-transitory computer storage medium storing a computer program, which when executed by one or more processors, cause the one or more processors to perform operations, the operations comprising:
    collecting at least one virtual scene characteristic parameter associated with a fidelity of a virtual scene presented by a virtual reality device;
    determining a fidelity reduction factor of the virtual scene based on the at least one virtual scene characteristic parameter; and
    executing a fidelity reducing operation for the virtual scene when the fidelity reduction factor reaches a predetermined threshold value;
    wherein the determining the fidelity reduction factor of the virtual scene based on the at least one virtual scene characteristic parameter comprises:
    for each virtual scene characteristic corresponding to each of the at least one virtual scene characteristic parameter, determining a fidelity coefficient of the each virtual scene characteristic based on the collected at least one characteristic parameter and a preset fidelity threshold value, the fidelity coefficient evaluating fidelity of single virtual scene characteristic; and
    determining the fidelity reduction factor of the virtual scene based on the determined fidelity coefficient of the each virtual scene characteristic and a weighted value corresponding to the fidelity coefficient of the each virtual scene characteristic.

* * * * *